United States Patent [19]
Huck et al.

[11] Patent Number: 5,313,605
[45] Date of Patent: May 17, 1994

[54] HIGH BANDWITH OUTPUT HIERARCHICAL MEMORY STORE INCLUDING A CACHE, FETCH BUFFER AND ROM

[75] Inventors: Scott Huck; Sunil Shenoy, both of Beaverton, Oreg.; Frank S. Smith, Chandler, Ariz.

[73] Assignee: Intel Corporation, Santa Clara, Calif.

[21] Appl. No.: 630,534

[22] Filed: Dec. 20, 1990

[51] Int. Cl.[5] .................. G06F 12/00; G06F 13/00; G06F 15/78; G11C 15/00
[52] U.S. Cl. .................... 395/425; 395/800; 395/DIG. 1; 365/49; 365/189.04
[58] Field of Search ............. 395/375, 400, 425, 800; 365/49, 230.03, 230.05, 189.04

[56] References Cited

U.S. PATENT DOCUMENTS

| | | | |
|---|---|---|---|
| 4,488,265 | 12/1984 | Kotecha | 365/189.03 |
| 4,769,788 | 9/1988 | Poeppelman et al. | 365/185 |
| 4,816,700 | 3/1989 | Imel | 307/269 |
| 5,023,844 | 6/1991 | Arnold et al. | 365/230.05 |
| 5,163,140 | 11/1992 | Stiles et al. | 395/425 |
| 5,185,872 | 2/1993 | Arnold et al. | 395/375 |

OTHER PUBLICATIONS

"80960CA 32-Bit High Performance Embedded Processor Data Sheet", Intel Sep. 1989 pp. 1-55.
"80960CA User's Manual", Intel, Appendices A and B, 1989.
McGeady, "The i960CA SuperScalar Implementation of the 80960 Architecture," IEEE, Jan. 1990, pp. 232-240.
Wilson, "Multiple Instruction Dispatch Drives RISC Chip to 66 Mips," Oct. 1989, Computer Design Mag., pp. 22, 24, 25.
Ryan, "Intel's 80960: An Architecture Optimized for Embedded Control" IEEE, Micro Jun. 1988, pp. 63-76.
Hinton et al., "Microarchitecture of the 80960 High-Integration Processor", IEEE, May 1988, pp. 362-365.
Hinton, "80960-Next Generation" IEEE, Apr. 1989 pp. 13-17.

Primary Examiner—Joseph L. Dixon
Assistant Examiner—Michael A. Whitfield
Attorney, Agent, or Firm—Owen L. Lamb

[57] ABSTRACT

A hierarchical memory which includes a backing store read/write memory (18) for storing first words, and a read-only memory RAM (60) for storing frequently used words. The buffer store has two parts, a cache RAM (64) and a two-word queue (62) comprised of two fetch buffers. The cache RAM is provided for storing a copy of some of the word stored in the backing store in accordance with a use algorithm. The ROM, queue buffers and cache RAM are simultaneously searched to see if the address for requested words is in either of them. If not, a fetch (76) is made of the backing store (18) and the words are written into the fetch buffers. The next time that address is presented, the fetch buffers are written into the cache and simultaneously read out to the bus. A first Y-mux (63) is provided between the ROM and the cache RAM for multiplexing the appropriate ROM columns to drive the Cache RAM bit lines directly when an internal micro-address is selected. The word positions within a row of the ROM are so ordered as to enable multiple words to be read out simultaneously regardless of what starting address is presented to the ROM. A second Y-mux (67) is provided between the cache RAM and the bus (19) for multiplexing the multiple words. The second Y-mux is controlled by at least one bit of the internally selected address. A multiplexer (74) is connected to the second Y-mux for shifting its input an appropriate amount according to bits of the starting address, such that the correct words are read out in the correct position.

2 Claims, 6 Drawing Sheets

HIGH BANDWITH OUTPUT HIERARCHICAL MEMORY STORE INCLUDING A CACHE, FETCH BUFFER AND ROM

CROSS REFERENCES TO RELATED APPLICATIONS

This application is related to copending patent application entitled "Instruction Fetch Unit in a Microprocessor that Executes Multiple Instructions in One Cycle and Switches Program Streams Every Cycle", Ser. No. 07/630,498, filed Dec. 20, 1993 and assigned to Intel Corporation.

FIELD OF THE INVENTION

The invention relates to computer hierarchical storage systems and more particularly to a read only memory (ROM) for storing frequently used words and an associated cache that supplies multiple words per clock to a micro bus on demand.

DESCRIPTION OF THE RELATED ART

In the microprocessor described in copending application Ser. No. 07/630,498 the average rate of instruction execution achievable is almost 4 times the rate at which instructions can be fetched over the instruction bus from external memory. A large internal instruction cache is necessary to speed up the operation. In addition, frequently executed code as well as microcode, which is designed to have exactly the same format as user instructions, is stored in an internal instruction microcode ROM to avoid having to fetch this code repeatedly from external memory. The instruction fetch unit must be able to supply multiple instructions per clock to a micro-bus from these several sources on demand in response to an address supplied by a program counter. In order to accomplish this, a buffer/backing store apparatus is needed to provide the large internal instruction cache and the ROM that stores the frequently executed code. Access to instruction words has to be very fast to allow multiple words to be read out and to provide for rapid updating of the cache.

It is desirable to have an instruction fetch unit that can supply 3 to 4 instructions simultaneously in parallel with the operation of the rest of the machine, regardless of where the program counter is pointing to. It is therefore an object of the present invention to provide a buffer/backing store that enables an associative search of the buffer store (cache), the reading out of multiple words upon a cache hit and the updating of the cache and the initiation a fetch from the backing store upon a cache miss on demand of an address, all within a single clock cycle.

SUMMARY OF THE INVENTION

The above object is accomplished inaccordance with the invention by providing a cache RAM and a microcode ROM that are able to produce three instructions per clock. Four words (0, 1, 2, 3) of 32 data bits each are associated with each row. Two select lines are provided for every row in the cache, one line selects words 0 and 1, and the other line selects words 2 and 3. It is possible for two select lines of the same row to turn on or one select line of one row and one select line of the next row to turn on depending upon what the address is. A shift multiplexer (mux) decodes the address and arranges the data bits so that correct words are read and aligned.

In accordance with an aspect of the invention a memory (backing store) is provided for storing first words corresponding to first unique address locations within the memory and a ROM for storing second words corresponding to second unique address locations at word positions within a row of the ROM. A buffer store is provided having two parts, a cache RAM and a queue of fetch buffers. The cache RAM stores a copy of some of the first words in accordance with a use algorithm. Each ROM bit-cell of the ROM is half the horizontal pitch of a Cache RAM bit-cell, such that two ROM columns correspond to one Cache RAM column. A first Y-mux is provided between the ROM and the cache RAM for multiplexing the appropriate ROM columns to drive the Cache RAM bit lines directly when an internal micro-address is selected. The word positions within a row of the ROM are so ordered as to enable multiple words to be read out simultaneously regardless of what starting address is presented to the ROM.

In accordance with a further aspect of the invention, a second Y-mux is provided between the cache RAM and the macro-bus for multiplexing the multiple words. The second Y-mux is controlled by at least one bit of the internally selected address. A multiplexer is connected to the second Y-mux for shifting its input an appropriate amount according to bits of the starting address, such that the correct words are read out in the correct position.

In accordance with a further aspect of the invention, the apparatus is driven by a clock in which each clock cycle is divided in to two phases, ph1 and ph2. An address to the ROM is set up by the end of PH1, and in PH2, the ROM is fired and the ROM outputs make their way past the first Y-mux and the second Y-mux to the Macro bus output.

In accordance with a further aspect of the invention the Cache RAM lies physically below the ROM such that one RAM cell matches two ROM cells in pitch and hence two ROM columns are multiplexed on to the bit lines of the Cache RAM to thereby allows cache update and reading out the word(s) to occur at the same time.

The invention has the advantage that the ROM is an always-hit portion of the cache which allows it to share the same logic as the cache, even the column lines in the array.

The invention has the further advantage that since the cache is multiple words wide it is capable of supplying multiple words per clock to the macro-bus, regardless of the alignment of the address presented to it.

The invention has the further advantage that since the queue drives strongly onto the bit lines when selected, it can overcome the Cache RAM and write into it if the data for the fetch resides in the queue instead of the cache or the ROM.

BRIEF DESCRIPTION OF THE DRAWINGS

The foregoing and other objects, features, and advantages of the invention will be apparent from the following more particular description of a preferred embodiment of the invention as illustrated in the accompanying drawings, wherein.

DESCRIPTION OF THE PREFERRED EMBODIMENT

The instruction fetch unit of the present invention supplies 3 to 4 instructions simultaneously in parallel with the operation of the rest of the machine, regardless of where the program counter is pointing to. This is accomplished by providing a cache RAM and a microcode ROM that are able to produce three instructions per clock. Four words (0, 1, 2, 3) of 32 data bits each are associated with each row. Two select lines are provided for every row in the cache, one line selects words 0 and 1, and the other line selects words 2 and 3. It is possible for two select lines of the same row to turn on or one select line of one row and one select line of the next row to turn on depending upon what the address is. The shift mux decodes the address and arranges the data bits so that correct words are read and aligned.

Figure 1:
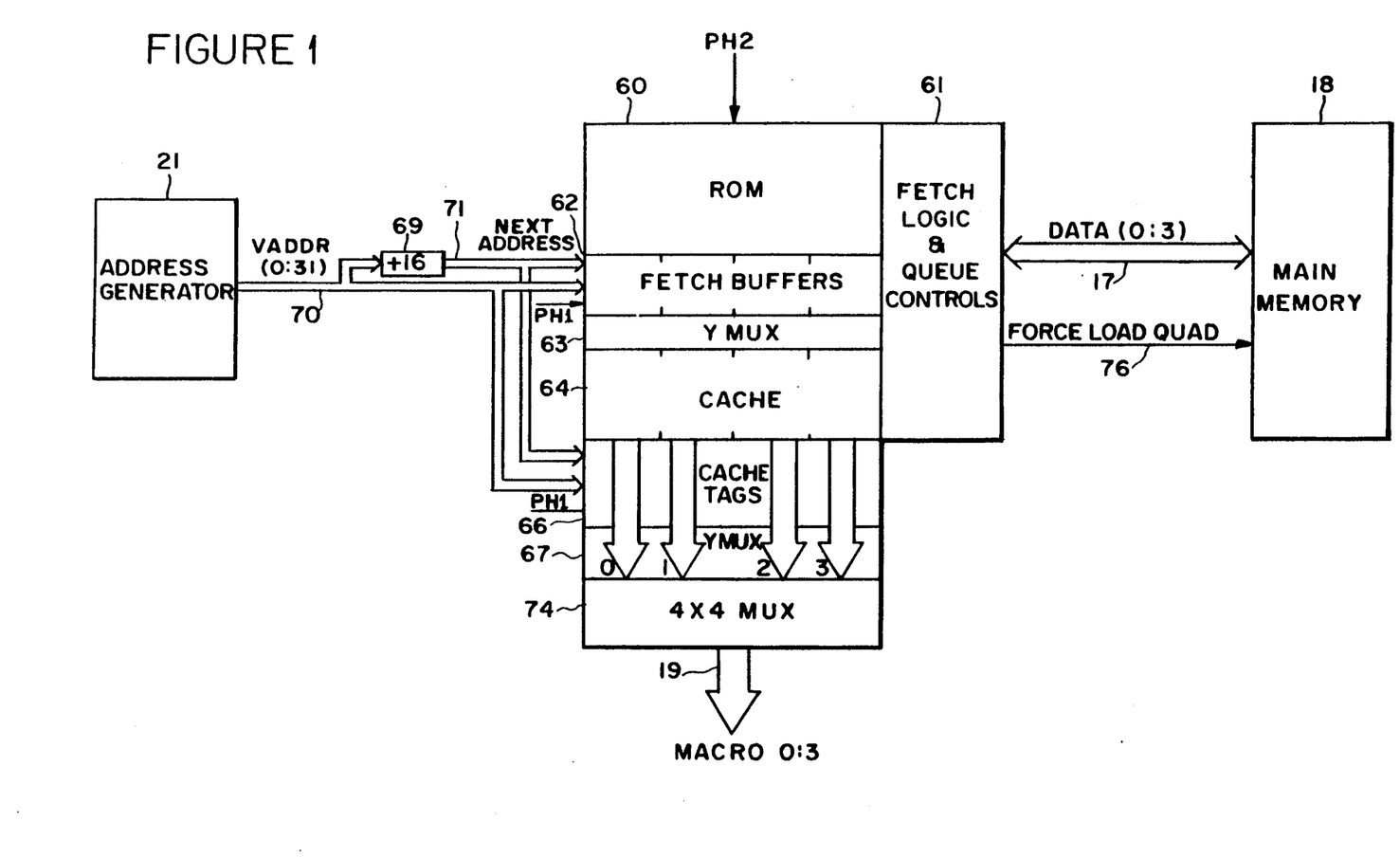
FIG. 1 is a block diagram of a buffer/backing store in which the present invention is embodied.

Referring to FIG. 1, the apparatus shown provides a macro bus (19) with multiple words every clock cycle. It contains a 2-way set-associative instruction cache (64) and a microcode ROM (60). The Cache and ROM are essentially one structure. The ROM is an always-hit portion of the cache. This allows it to share the same logic as the cache, even the column lines int eh array.

Figure 7:
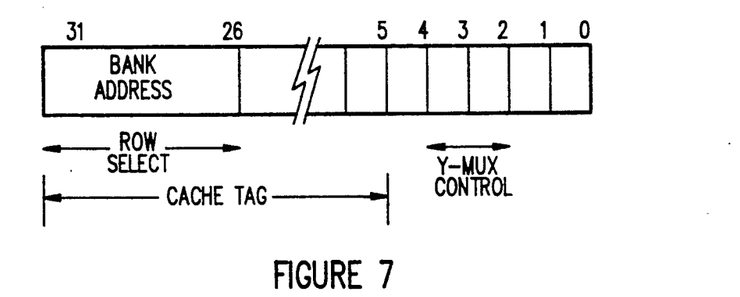
FIG. 7 is a diagram of the address format.

FIG. 7 is a diagram of the address format of addresses supplied by the address generator (21) of FIG. 1. The bank select portion, cache tag portion and Y-mux control bits of the address will be described subsequently.

Figure 8:
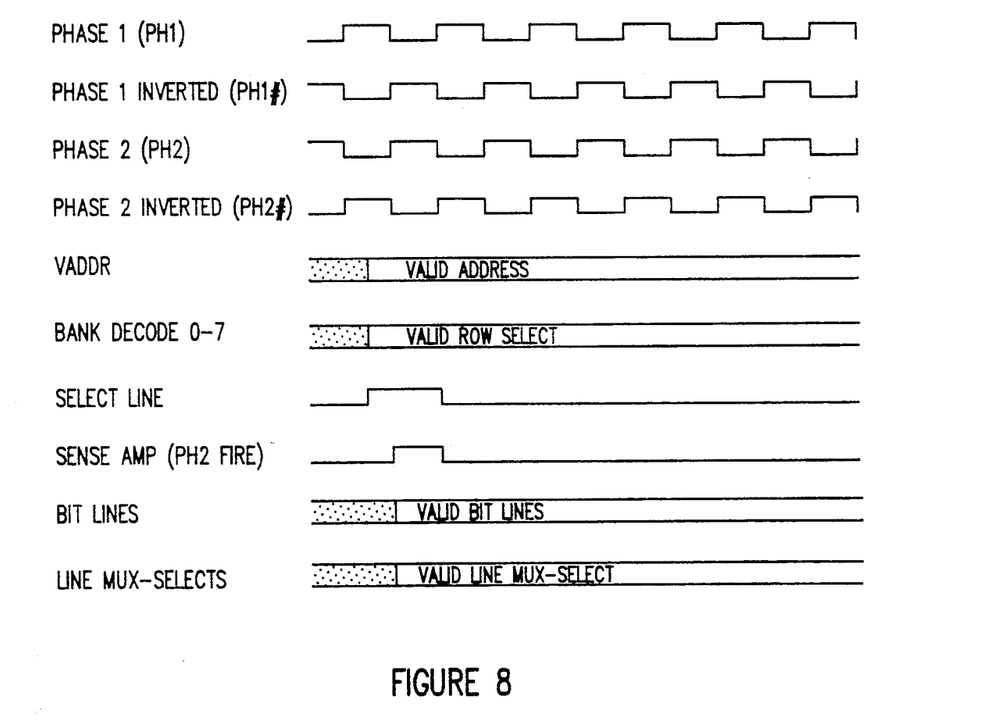
FIG. 8 is a timing diagram of the operation of the invention.

As shown in the timing diagram of FIG. 8, the circuit of FIG. 1 is driven by a non-overlapping clock phase of the type described in U.S. Pat. No. 4,816,700 of Michael T. Imel. Phase 1 (PH1) and phase 2 (PH2) are NMOS non-overlapping clocks with equal duty cycles. Phase 1 inverted (PH1#) and phase 2 inverted (PH2#) are PMOS analogs to PH1 and PH2 and are exact inversions of PH1 and PH2, respectively.

The cache (64) is four words wide and is capable of supplying four words per clock to the macro-bus. It consistently supplies three or four words per clock regardless of the alignment of the address (70) presented to the logic.

The Cache also contains external fetch handling logic (61) that is used when an address for the desired words is not in the cache, i.e. when a fetch misses the cache.

The ROM (60) is 4K bytes in size. Each horizontal row of the ROM is i512 bits wide so that there are 64 such rows. There is a Y-mux (63) at the bottom of the ROM that multiplexes one of two columns onto the bit lines of the Cache so that if an internal address is selected, the ROM can be read out in exactly the same way as the Cache (64) would be.

The Cache (64) is 512 bytes in size. It is 2-way set associative, the 512 bytes being partitioned into 16 sets each containing 2 blocks with each block consisting of 16 bytes (4 bytes make a word). Each horizontal row of the cache is 256 bits wide and there are 16 rows with each row corresponding to a set. There are two levels of muxing. One is via Y-muxes selecting between Line 0 and Line 1 of the selected set. (of course if an internal address was selected, it is the ROM that is pulling down the bit lines and hence an address bit that controls this Y-muxing). The other Y-mux controls which one of two adjacent rows drives the bit lines for the cache. This selection is controlled by an address bit and enables words to be simultaneously read from two contiguous sets.

The Queue of fetch buffers (62) is similar to the Cache in organization. The Queue drives strongly onto the bit lines when selected so that it can overcome the Cache RAM and write into it if the data for the fetch resides in the queue instead of the cache or the ROM.

At the bottom of this trio lies a 4×4 (four words by four words) multiplexer (74) which is necessary to align into proper order the contiguous words which are read out. This shifter is controlled by an address bit. Finally, the four 32-bit words (128-bits of data) enter a set of sense amplifiers and is driven out on the macro-bus (19).

The Cache tags are a register array 54 bits wide by 16 rows deep. They contain the tags for the cache sets, the valid bits, and the least recently used (LRU) bits. There are also a series of comparators that compare the current (70 and next micro-addresses (71) with the appropriate tags from the sets and the queue entries. At the top, the Queue interfaces to the main memory (18) via the Data (0:3) lines (17).

Fetch Buffers

A fetch to main memory (18) is issued upon a cache miss. However the machine may switch to another address before the fetched information returns, so, on the cycle when the fetched information returns, the address (21) may not refer to that fetch. A mechanism is provided to write the fetched contents into the cache when the word being requested out of the cache may be from some other address. The returning words are buffered in one of the fetch buffers (62) until the logic (21) presents again the address that triggered the fetch. At that time, the fetched words are written from the buffer (62) into the cache and simultaneously read out of the cache onto the macro bus (19). Two fetch buffers are provided for this purpose so that two fetches can be outstanding at any given time. Each fetch buffer is four words wide since quad-word fetches are issued by the force quad line (76).

The buffers are associatively mapped to the address (70). To avoid having to provide two 28-bit address comparators for each buffer, only a short comparison on the block address is done. If the block address part of the address (70) matches that of the fetched block then the buffer drives the bit lines of the cache writing its contents into it. The contents are simultaneously also read out to the macro bus (19). It is possible that the full address will not match but in this case, a cache miss will be flagged because the associative search of the cache tags is done with the search argument being the full address. If there is a match on the fetch buffer comparisons but a miss in the cache tags, then the fetch is effectively cancelled by marking the fetch buffer invalid.

There are two cache lines for each set. Each fetch buffer stores the block address of a fetched quad-word and state bits that indicate which cache line the address is stored in. The buffer can only drive the bit lines pertaining to that cache line. The addresses may straddle block boundaries and 2 comparisons have actually to be done per buffer, just as in the cache. But because there are just block address comparisons, there is plenty of time to do them in PH1 and their space requirements are also modest.

Valid bits

Quad-word fetches (76) are issued but the words return one per cycle because the external bus (17) is only 32 bits wide. The incoming words are written into the cache and read out as they arrive, if the address (70) points to them at that time. A valid bit is provided for each word in the cache. This valid bit is set when the word associated with it is written from the buffer and is cleared when the block associated with it is replaced because of a cache miss. The valid bit can be associated with each set and located in the cache tags, or as in the present embodiment, the valid bit is located in the cache itself as a 33rd bit of each word.

Timings

The address (70) is set up about mid-way in a 13 ns PH1. The remainder of the first phase is used to set up the decoders in the cache and ROM. PH2 fires the decoders that enable the bit lines to be driven. The rate of fall of the bit lines is about 200 mV per ns. The standard differential sense amplifier is used since it is faster than the dynamic "self-timed" schemes sometimes employed. The final sensed, muxed and buffered outputs (to drive about 2PF of load) are available about 10 ns into PH2 leaving 3 ns in that phase for some early decoding. This assumes that the line-mux selects are available from the cache tags before 6 ns in PH2, the second phase.

Sequence of Actions

Figure 5:
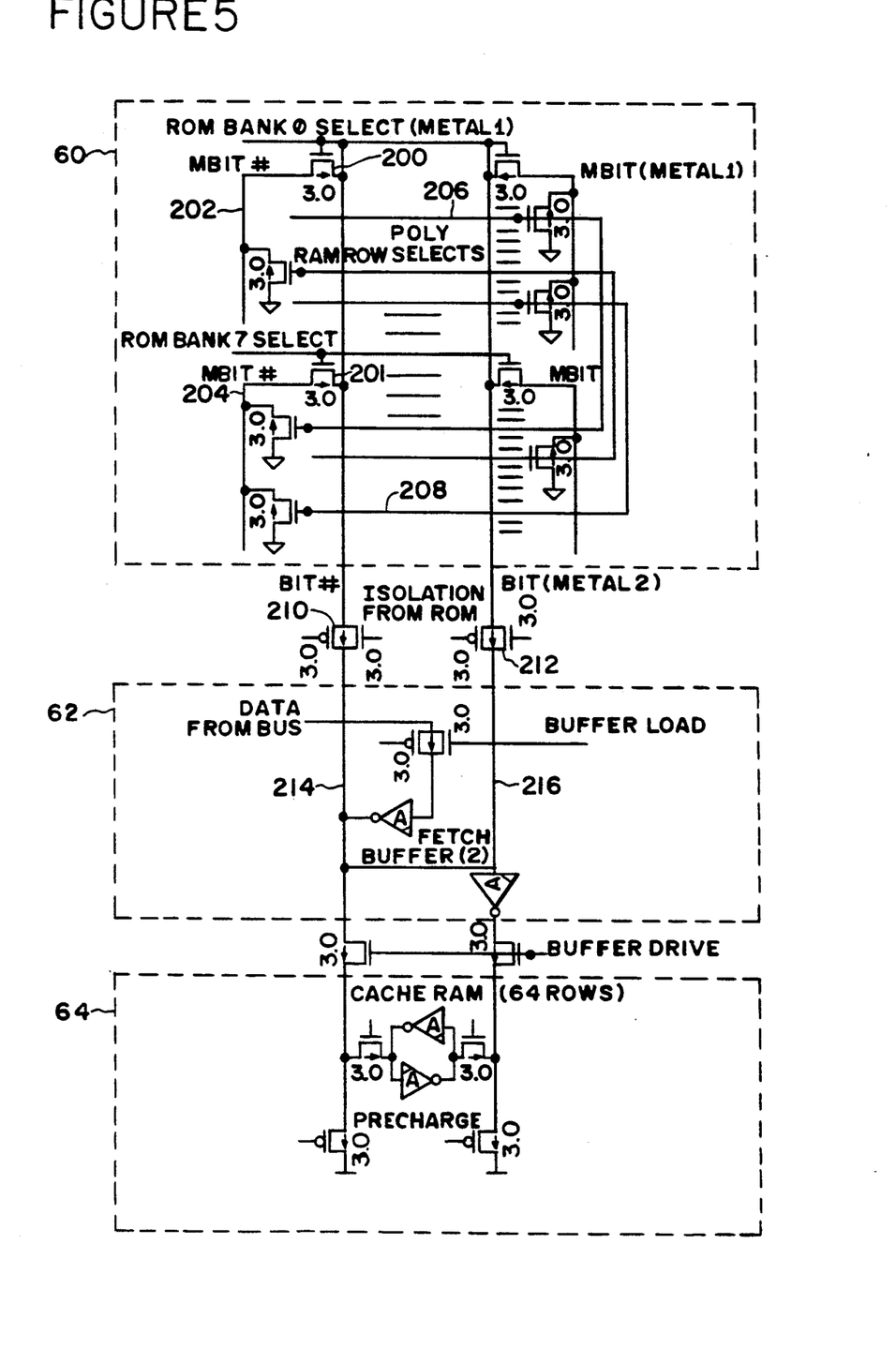
FIG. 5 is a schematic diagram of a bit slice of the cache-ROM-queue.

Refer to FIG. 5 and FIG. 8. Inmost other systems, if there is a cache miss, the system waits until the required words are fetched from external memory. In prior systems, the updating of the cache tags can be done at the time the fetched words are written into the cache since no program activity occurs between the time that a miss is detected and the fetched words return.

If there is a cache miss on an address, the address generator (21) may change to another address located in the ROM, in the same cache set or in another set. In view of this all the book-keeping has to finish within a cycle. The effect of this is felt in the tags. Here, the logic must read out a tag, detect a cache hit (and if so to which line) or a miss. In case of a miss, one of the tags has to be replaced with the tag of the address that is to be fetched. Thus a read-decide-write has to e done in one cycle. Conventional RAMs are precharged on one phase and read or written in the other. The solution in accordance with the present invention is to read in the same phase (PH1) as the precharge. The address is also changing in PH1 but the precharge keeps one RAM row from affecting another during the transition. Enough of a voltage differential is obtained by the end of the phase of fire a dynamic cross-coupled sense amplifier with PH2. In PH2, a dynamic comparator is also fired to obtain the line-select lines for the cache. The comparator outputs also determine if a write has to be done in the tag array and if so, this is accomplished by the end of PH2. This scheme also allows the cache mux-select lines to be set up about half-way in PH2 which is necessary to get the outputs of the cache out in time.

In phase 2 (PH2), the cache is read. If there is a miss or if some of the required words are missing and a fetch is not already outstanding for them, then a fetch is issued by the logic (61). A prefetch of the next block may also be issued under certain circumstances. If a fetch is issued, a fetch buffer is reserved for it. The block address of the fetched quad-word and the cache line that the address is stored in, is maintained as part of the state of that fetch buffer. Every PH1, the block address of each fetch buffer is compared with that of the address (70). If there is a match, then on PH2, that buffer drives the appropriate bit lines. Words returning from the bus have to make it to the fetch buffer by the very end of PH1, so that they may be correctly driven on to the bit lines in PH2. Actually, since the drivers of the fetch buffers are much stronger than the RAM cell transistor, the words can return about 4 ns into PH2 and still be read out in time. This time is thus saved from the external memory access time.

Figure 2:
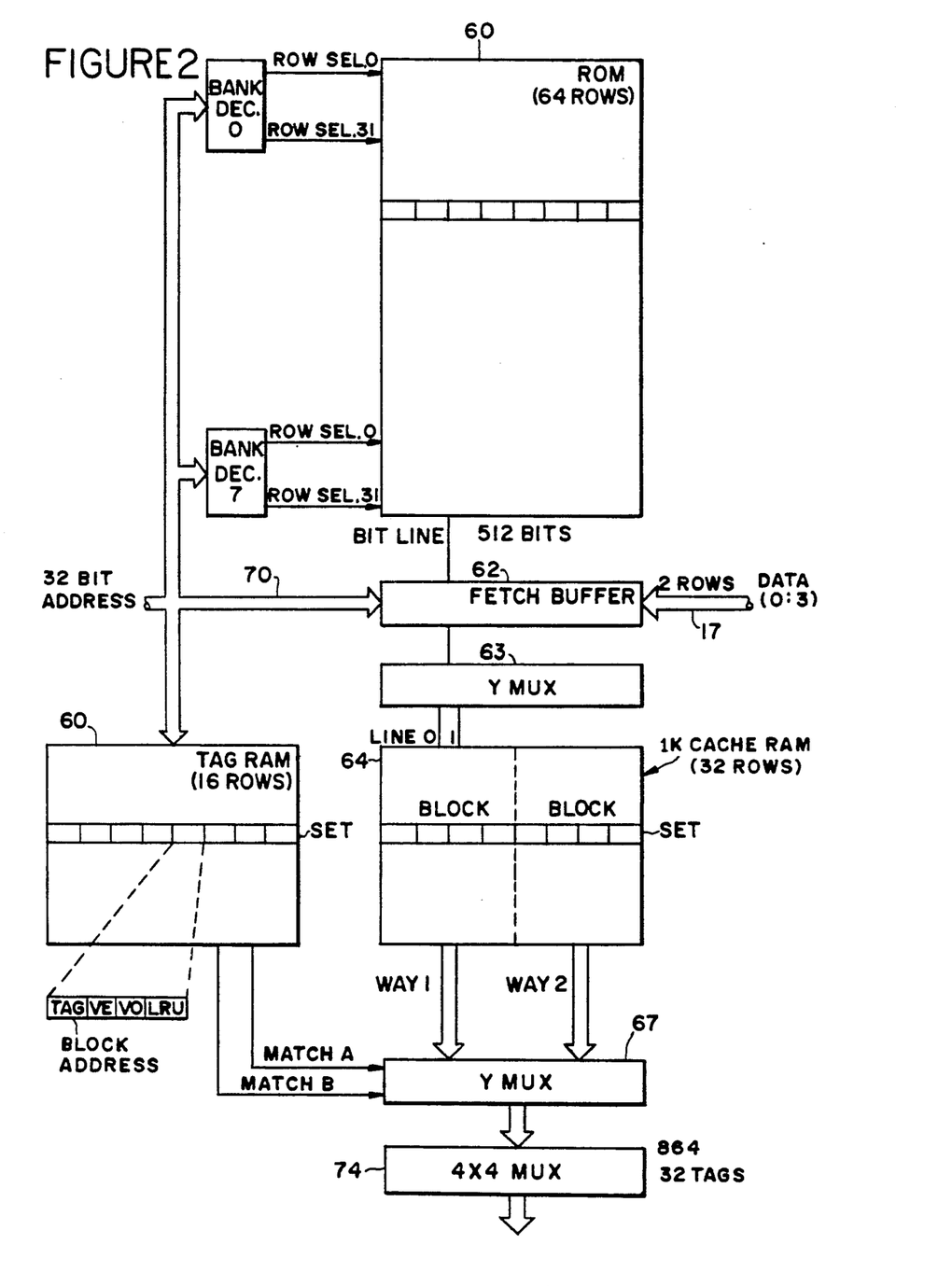
FIG. 2 is a more detailed block diagram of the buffer/backing store shown in FIG. 1.

Refer to FIG. 2. The ROM (60) is organized as 512 bits (16 words) wide and 64 rows deep to make 4K bytes (1K words) The horizontal pitch of each ROM bit-cell is half the horizontal pitch of a Cache RAM cell. Hence two ROM columns correspond to one Cache RAM column. There is a Y-mux (63) between the ROM and the Cache to do the muxing such that the appropriate ROM columns can drive the Cache RAM bit lines directly when an internal micro-address is selected. The ROM word positions within a row are ordered so as to enable 3 or 4 words to be read out simultaneously regardless of what the starting address is. On even word boundaries 4 words can be read out and on odd boundaries 3 words can be read out. However, if the word address modulo 16 is greater than 12 then the words may straddle a row boundary and since two rows can never be simultaneously selected, fewer words will be read out in these cases. Because of the 256-bit wide organization of the cache (64) it is physically intractable to place the ROM (60) anywhere except literally on top of the cache. It has to share the actual bit lines of the cache. The ROM also has to meet the same goals as the cache in terms of bandwidth. A bit slice of the organization of the entire data path is shown in FIG. 5. There are 8 ROM banks, each bank having 32 row select lines. Each row has 512 ROM bits, with the configuration of bits within a row being similar to the cache. Each ROM cell consists of a transistor (200, 201) which is connected to either the MBIT line (202) or MBIT# line (204) of its bank depending on its value. The 32 row select lines (206, 208) of each bank are common between banks and use the upper 5 bits of the ROM space address. In other words, there are a total of only 32 decoders and buffers for them. The lower bits of the address select the bank and their decoders are like the cache decoders shown in FIG. 3 with an upper and a lower row select for each bank. Thus one can imagine that each bank of the ROM resembles a row of the cache except that there are 32 "planes" of banks with each plane consisting of one of the 32 rows from each of the 8 banks. An understanding of how 3 or 4 continuous words are read out on every access follows from the discussion on the cache.

A 4-word chunk may straddle a plane boundary. In this case the planes that have to be selected for bank 7 and bank 0 are different and this cannot be done if there are only 32 plane decoders. The problem is solved by having an additional 32 decoders for bank 0 which in the plane-straddling case effectively select the next (modulo 32) row from that selected by the decoders for the other banks.

Physically, each RAM cell is about 8.5 microns wide and 30 microns tall. Each ROM cell has to have the same width but is about 8 times shorter. The layout used for the ROM cell is the well-known EPROM cell layout. Because there are only 64 decoders for the ROM, their layout in the shorter pitch is quite easy. The row select lines are routed in polysilicon. The bit lines common with the cache are metal2 and the MBIT lines are metal1. There is an isolation device (210, 212) between the ROM and the cache bit lines (214, 216) so that the capacitance of the ROM bit lines is not seen by the cache. The effective strength of the ROM drive on the bit lines is almost twice the strength of the cache drive so that the ROM can handle a bigger capacitance.

TABLE I shows the way the word addresses are organized within a row giving the per-bit layout for even bits. The Y-multiplexer (63) is controlled by bit 5 of the address. In TABLE I and TABLE II the state of bit 5 is indicated by 5 and 5# for bit 5 being 1 and 0 respectively. For odd bit positions, the pattern is flipped as shown in TABLE II.

TABLE I

```
        |F|B|7|3|E|A|6|2|D|9|5|1|C|8|4|0|(hex)
   EV0  | |x| |x| |x| |x| |x| |x| |x| |x|
   OD0  | |x| |x| |x| |x|x| |x| |x| |x| |

EV0  |x| |x| |x| |x| |x| |x| |x| |x| |
   OD0  |x| |x| |x| |x| | |x| | | |x| | |
         5   5#  5   5#  5   5#  5   5#
```

TABLE II

```
        |C|8|4|0|D|9|5|1|E|A|6|2|F|B|7|3|
   EV0  | |x| |x| |x| |x| |x| |x| |x| |x|
   OD0  |x| |x| |x| |x| | |x| |x| |x| |x|

EV0  |x| |x| |x| |x| |x| |x| |x| |x| |
   OD0  | |x| | |x| | |x| |x| |x| |x| |x| |
         5   5#  5   5#  5   5#  5   5#
```

The control lines for Y-mux (63) indicated in TABLE II correspond to bits 4 and 3 of the starting word address as shown in TABLE III.

TABLE III

| Control Line | Bit 4 | Bit 3 |
|---|---|---|
| EV0 | 0 | 0 |
| OD0 | 0 | 1 |
| EV1 | 1 | 0 |
| OD1 | 1 | 1 |

Thus 8 lines per bit converge on the Cache RAM bit lines. At the bottom of the cache is another Y-mux (67). When the address is internal, this mux is controlled by bit 5 of the address. Finally below this Y-mux (67) is the 4×4 multiplexer (74) that repositions words at its input according to the value of bits 3 and 4 of the starting address.

With this information, it can be seen that on even word boundaries, (with the exception noted above) the correct 4 words are read out in the correct position and on odd word boundaries, 3 words are read out likewise.

The Cache RAM

Figure 3:
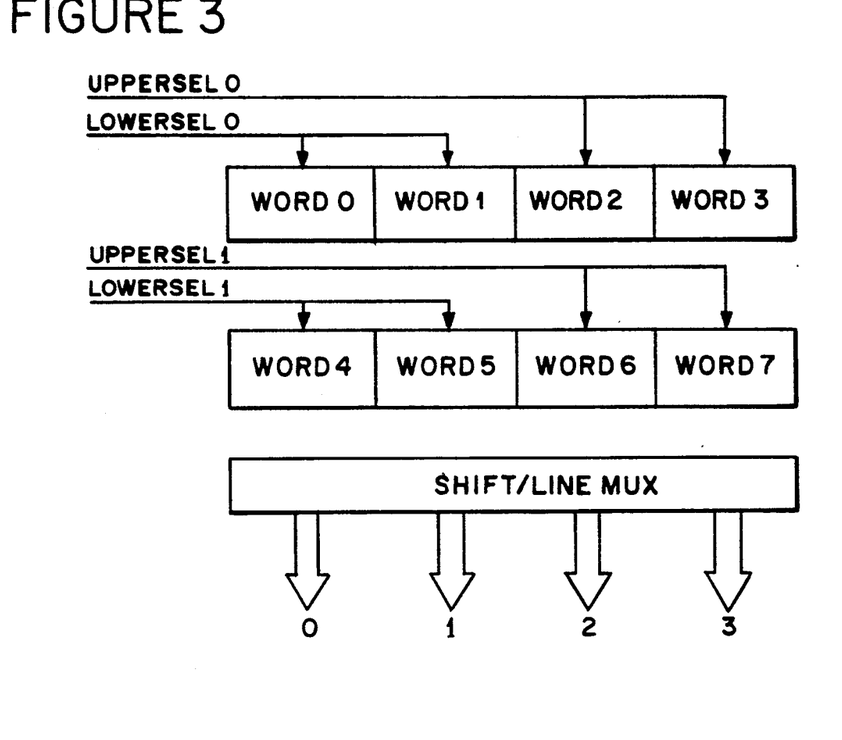
FIG. 3 is a schematic diagram of the upper and lower select drivers.
Figure 4:
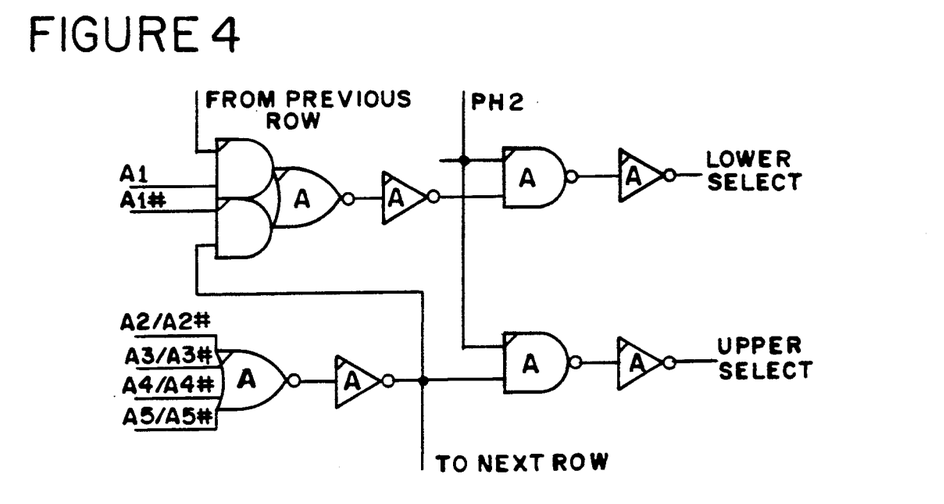
FIG. 4 is a schematic diagram of the row decoders.

Refer to FIG. 2. There are 256 bits of RAM in each physical row of the cache. This corresponds to 8 physically contiguous RAM cells per bit position. The organization of these 8 cells is shown in FIG. 3. The RAM cell used is the standard 6-transistor RAM cell. However there are two row selects that run in metal1 across each physical row. One of them, called the upper row select (Uppersel) selects words 2 and 3. The other (Lowersel) selects words 0 and 1. Bits 2 through 8 of the program counter are used as the block address for the cache to select a row. (Addresses refer to word addresses of 32-bit words since byte addresses are not significant). For each row address, 2 row selects become active. If bit 1 of the address (70) is a 0 then the upper and lower row selects of the same physical row become active. If it is a 1 then the upper row select of one physical row and the lower row select of the next physical row become active. In the first case, words 0 through 3 are read out from the same physical row. In the second case words 2 and 3 are read out from one row and words 0 and 1 from the next. In each case, at least 3 of these words are exactly the words desired. A shift mux (74) at the output shifts the sensed bit line outputs appropriately (depending on the lower 2 bits of the address) so that for any program address, 3 or 4 correctly aligned words are read out from the cache (assuming of course that they are in the cache). The simplified logic of the row decoders is shown in FIG. 4 which is a block diagram of the decoder. The upper select line is always chosen, whether it is desired to select the first row or the second row. The lower select line is a mux of the upper select of the current row and the upper select of the previous row. Thus, the upper select 0 may occur in conjunction with the lower select 1, depending upon the bits of the address presented to the decoder.

A similar decoding scheme is utilized with respect to the microcode ROM. The ROM consists of a transistor that can be programmed either on the bit line or on the bit select line, depending upon whether a 0 or 1 is to be programmed for that location. This allows four words to be read at a time, similar to the arrangement used with respect to the RAM cell. Thus, with reference to FIG. 5, each ROM bank 0 select is analogous to the upper select or lower select as shown in FIG. 4.

There is also a line-select multiplexer (67) before the shift mux which reduces the 8 words read out to 4. Since the 8 words read out on the bit lines may straddle a set boundary, this mux is controlled by 2 sets of select lines, one for the words coming out on the "upper" bit lines and the other for the ones on the "lower". This is further clarified in the section on the cache tags.

The Cache RAM (64) physically lies below the ROM (60). One RAM cell matches 2 ROM cells in pitch and hence two ROM columns are multiplexed on to the bit lines of the Cache RAM. If the address is internal however, the ROM does not drive but the words come out of the Cache RAM. In certain cases, the words may lie in the Queue (62). In this case, the RAM and the Queue drive the bit lines but the intent is to let the queue write into the selected Cache row. This allows cache update and reading out the word(s) to happen at the same time.

Like the ROM (60), the organization of the Cache (64) is also key to reading out a maximum number of contiguous words per access. The RAM consists of 16 rows of 256 bits each. Each row corresponds to a set. Thus each row contains 8 words, 4 words for Line 0 of that set and 4 for Line 1. The lines are interleaved with each other so that the corresponding bits for Line 0 and Line 1 are always adjacent to each other. The Y-mux at the bottom of the RAM for an internal access is controlled by the line selects so that the correct line is read out. In addition to this there is a mechanism to enable 4 words to be read out on every even word boundary and 3 on every odd word boundary. To achieve this, the ordering of words within a bit position in a row is as shown in Table IV (the Line 0/Line 1 pair is not shown).

TABLE IV

| Bit x(even) | Bit x + 1(odd) |
|---|---|
| Set N | \|3\|2\|1\|0\| \|0\|1\|2\|3\| |
| Set N + 1 | \|7\|6\|5\|4\| \|4\|5\|6\|7\| |

Words 2 and 3 are called the odd words and are always selected for the addressed set. The other two words are called the even words. If the block offset is 0 or 1, they are selected for the addressed set. However if the block offset is 2 or 3, the even words from the following set are selected. To achieve this there are two row select lines per row running into the array. The reason the bit order is alternately flipped is so that 4 odd bits and 4 even bits will always be together except at the array borders. This makes the layout more compact.

The result is as shown in Tables V and VI.

TABLE V

| | (For Even Bits) | |
|---|---|---|
| Start Address | Words read | Words desired |
| 0 | 3210 | 3210 |
| 1 | 3210 | −321 |
| 2 | 3254 | 5432 |
| 3 | 3254 | −543 |

TABLE VI

| | (For Odd Bits) | |
|---|---|---|
| Start Address | Words read | Words desired |
| 0 | 0123 | 3210 |
| 1 | 0123 | −321 |
| 2 | 4523 | 5432 |
| 3 | 4523 | −543 |

In the 4×4 multiplexer (74) the words are read out in order for every bit. (there is a different multiplexer cell for alternate bits). It is now clear why the bits in the ROM too have to be flipped (as described above). This ensures that the 4×4 multiplexer (74) works well for the ROM too.

Just like the ROM there are really additional predecode bits along with each instruction word in the cache. But this does not affect the above organization in any way. Like the ROM, the address is always set up in PH1. In PH2, the Cache RAM is read out if the address is internal. The Line selections also set up in the middle of PH2 after the tag comparisons (described later). If the selected set is in the queue, then the queue entry is also selected in addition to the cache row(s) and the cache is thus updated. Note that the cache RAM is "dumb" in the sense that it is always read out for an internal address regardless of whether there is a cache hit or not. Other mechanisms (described subsequently) take care of all this.

Cache Tags RAM and Controls

Figure 6:
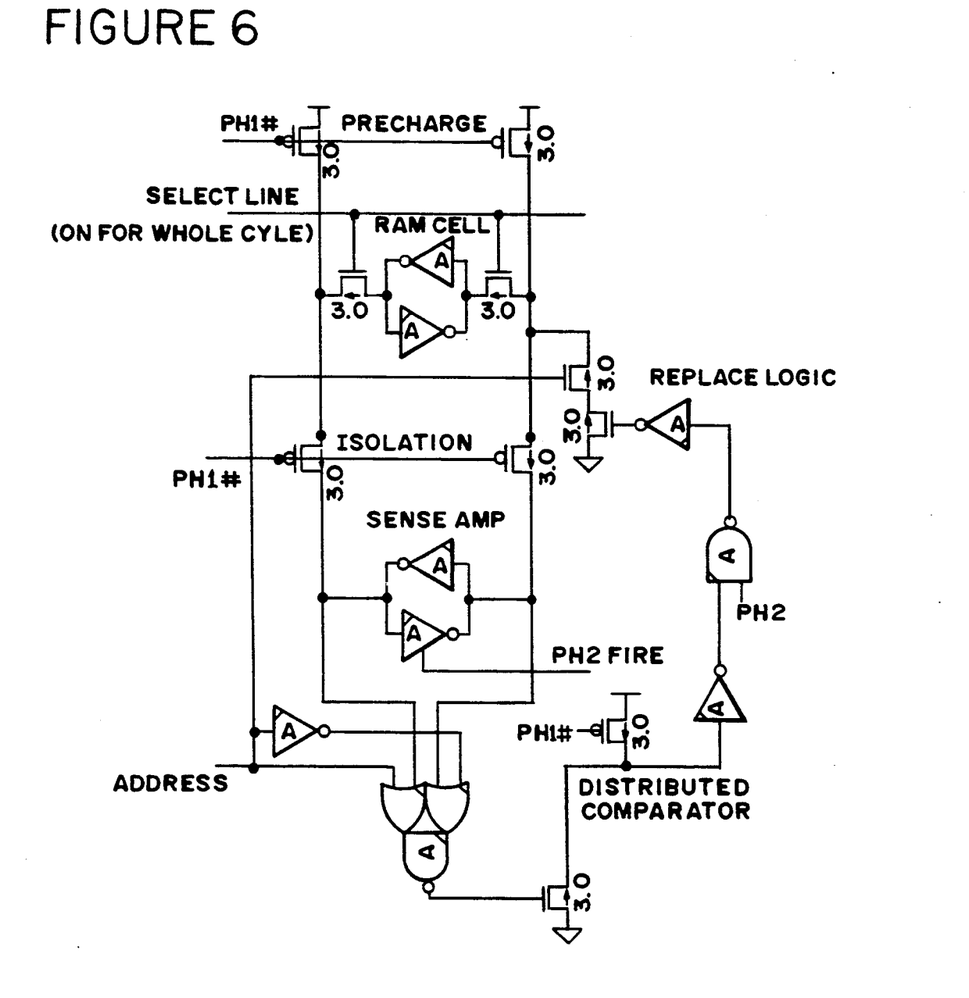
FIG. 6 is a schematic diagram of a bit slice of the cache tags.

There are 27 bits for each cache tag (66). The best way to organize this RAM is to fit it into the pitch of the cache and ROM, the array doubled up so that each physical row of the tag array has 8 tags or close to 256 RAM cells. For each access, 4 distinct tags may have to be read out, since the multiple words read out of the cache may straddle a set boundary. Since these tags themselves may have to come from different physical rows, multiple row selects for each physical row are provided. The translation from physical rows in the cache tag array to the correct "upper" and "lower" line-select lines for the cache is important. Also important is the timing of the read-write sequence for the cache tags.

The Cache tag RAM is a register array 54 bits wide by 16 rows deep. Each row corresponds to a set. Each row contains for Line 0 and Line 1 of that set, the following fields:

Tag: The tag field contains bits 7–31 of the address of the block that is currently in that set for that line.

Vale: This is a valid bit for the "lower half-block" of a block.

Valo: This is a valid bit for the "higher half-block" of a block.

LRU: This is the least recently used bit which indicates which of the two lines in the set should be replaced if necessary. There is only 1 bit for both lines.

In PH1, the 32-bit micro-address is presented to the tags. The next micro-address (always the current address+16) is also presented simultaneously. Two rows of the array are read out. There are 4 24-bit comparators in which the following comparisons are done:

| Current address | with Line 0 of current set |
|---|---|
| Current address | with Line 1 of current set |
| Next address | with Line 0 of next set |
| Next address | with Line 1 of next set |

The two LRU bits are read out into CURLRU and NXTLRU. The 8 valid bits are also read out into:

CURL0VALE (Current Set, Line 0 Valid bit for even half-block)
CURL0VALO (Current Set, Line 0 Valid bit for odd half-block)
CURL1VALE
CURL1VALO
NXTL0VALE
NXTL0VALO
NXTL1VALE
NXTL1VALO Typical Operation In clock phase PH1, the Queue (62) receives a 32-bit wide micro-address, the Fetch Instruction Pointer-IP (70). It also receives the "next fetch" address which is always the Fetch IP+16, through the +16 adder (69). In this PH1, the tag RAM array (66) is read for the sets corresponding to both of these addresses. The words associated with this address may lie in the ROM (60), the cache (64), the queue (62) or in none of these. Comparisons on the address (70) determine which is the case. In PH2, a set of contiguous words is read out from the appropriate sub-block. Each word (0–3) read out has a valid bit which is appropriately set or reset. The corresponding cache and queue management functions also take place. A bus fetch may also be initiated by the fetch logic (61) if four continuous valid words could not be returned on the current micro-address fetch.

The tag array also contains the valid bits and the LRU bits necessary for cache update. A total of 4 tags are read out from the tag array, two for Line 0 and two for Line 1. Comparisons are done with the appropriate bits from the two addresses (70, 71) to determine which line (if any) matches for each address. The two addresses are also compared with the 2 queue entries to determine if there is a match with any of them. Thus a total of 8 comparisons are done. The queue comparisons happen in PH1 but the cache tag comparison can spill into PH2. In PH2, the actual instruction words are read out. If the address is internal, then the word is read out from the ROM. If the address is not internal, then the required word or words may be in the Cache, queue or in neither of them. If the words are in the queue, or if a request for a block of words at that address had ben inserted in the queue previously, then the contents of the matched queue entry is read out. Actually, the cache RAM row for that set is also read out, but the queue drivers write into the cache row so that the cache gets written into from the queue. If the words are not in the queue then the word or words are read out from the cache set. The Y-mux (63) ensures that the correct line is read out. It is important to note that the word(s) are read out from the cache (or queue) at all times. Anywhere from 0 to 4 words may be valid in a given cycle. For instance if there is a cache miss and the words are not in the queue either, then garbage is read out every time that micro-address is presented until the information arrives in the queue. The next time after this that the address is presented, the word(s) are read out from the queue and written into the cache also. Note also that in general, from 0 to 4 words may be valid. How many are valid depends on the word boundary of the micro-address, and (if there is a cache miss) on what has actually returned in the queue. The logic always formulates the final valid bits taking all this into account so that by the end of PH2, they are correct and whatever has been read out can be correctly processed. In general, if none of the words read out were valid, the same address will be presented repeatedly.

While the invention has been particularly shown and described with reference to preferred embodiments thereof, it will be understood by those skilled in the art that the foregoing and other changes in form and detail may be made therein without departing from the scope of the invention.

What is claimed is:

1. A buffer-backing store apparatus for supplying stored words at unique address locations to a macrobus (19) in response to an address comprising:
   a memory (18) for storing first words corresponding to first unique address locations within said memory;
   a ROM (60) for storing second words corresponding to second unique address locations at word positions within a row of said ROM;
   said ROM having ROM column lines;
   a cache RAM (64) for storing a copy of some of said first words in accordance with a use algorithm;
   said cache RAM having cache RAM column lines and cache RAM bit lines; and,
   a first multiplexer (63) between said ROM (60) and said cache RAM (64) for multiplexing said ROM column lines to drive said Cache RAM bit lines directly;
   said word positions within a row of said ROM being so ordered as to enable multiple words to be read out simultaneously;
   each ROM bit-cell of said ROM (60) being half the horizontal pitch of a Cache RAM bit-cell, such that two ROM columns correspond to one Cache RAM column; and,
   said Cache RAM (64) being coupled to said ROM (60) such that one RAM cell matches two ROM cells in pitch and hence two ROM columns are multiplexed to the bit lines of said Cache RAM to thereby allow cache update and read out of the multiple words to occur at the same time.

2. A buffer-backing store apparatus for supplying stored words at unique address locations to a macrobus (19) comprising:
   a memory (18) for storing words at first unique address locations;
   a ROM (60) for storing words at second unique address locations;
   said ROM having ROM column lines;
   a cache RAM (64) for storing a copy of some of said first words in accordance with a use algorithm;
   said cache RAM having cache RAM column lines nd cache RAM bit lines;
   said ROM (60) being organized as 512 bits wide and 64 rows deep to make 4K bytes (1K words), the horizontal pitch of each ROM bit-cell being half the horizontal pitch of a Cache RAM bit-cell, such that two of said ROM column lines correspond to one of said Cache RAM column lines;
   a first multiplexer (63) between said ROM (60) and said cache RAM (64) for multiplexing ROM columns lines to drive the Cache RAM bit lines directly in response to an address;
   ROM word positions within a row being so ordered as to enable words to be read out simultaneously, to thereby enable on even word boundaries four words to be read out and on odd boundaries four words to be read out;
   said Cache RAM (64) being coupled to said ROM (60) such that one RAM cell matches two ROM cells in pitch and two ROM columns being multiplexed to said cache RAM to thereby allow cache update and read out of the multiple words to occur at the same time bit lines of said Cache RAM.

* * * * *